May 11, 1965  J. R. CHISHOLM  3,182,803
FILTERING DEVICE
Filed May 27, 1963

INVENTOR.
JAMES R. CHISHOLM
BY
ATTORNEY

3,182,803
FILTERING DEVICE
James R. Chisholm, 17 Hillside Road, Boxford, Mass.
Filed May 27, 1963, Ser. No. 283,179
1 Claim. (Cl. 210—266)

The present invention relates generally to filtration of gases and/or liquids, and in particular to filtering devices incorporating a removable and reusable element containing the filtering media.

In the filtering art numerous disposable cartridge type elements have been disclosed containing such media as activated charcoal, fuller's earth, paper, cotton or synthetic thread waste, for use in filtering of gases and/or liquids. In certain applications sintered homogenous metallic filters have also been provided. The use of such conventional filters results in the need for frequent replacement which is costly. Further, the use of non-uniform filtering materials results in difficulty in controlling the porosity with an accompanying inefficient flow rate.

The present invention has for its primary object the provision of a new and novel filtering device containing a media of uniform size and shape to define a tortuous path of controlled porosity.

A further object of the present invention is the provision of a new and novel filtering device containing a media which is readily reuseable and may be frequently cleaned to provide a high degree of filtration efficiency.

Still another object of the present invention is the provision of a new and novel filtering device for gases and/or liquids containing a filtering media having uniform size and shape capable of providing a high flow rate and a low pressure drop.

A feature of the present invention resides in the provision of spherical shaped metallic or non-metallic bead members within an enclosure defining inlet and outlet channel members. The filtering media is readily cleaned and reused to provide for effective filtration over longer periods of time. Corrosive gases or liquids both hot and at room temperature may be handled with the filtering device of my invention. Each element in the filtering media is uniformly sized and shaped to thereby control the porosity of the path exposed to the gases or liquids. The controlling of the porosity, as well as the non-compacting of the elements provide a high flow rate and low pressure drop.

Figure 1:
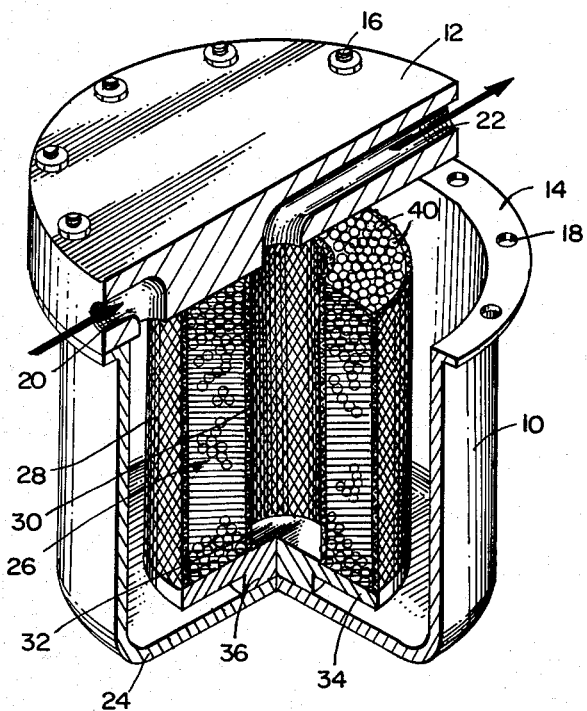
Figure 2:
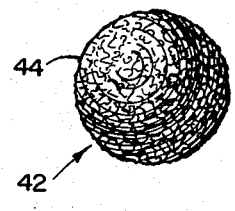

Other objects, features and advantages will be evident after consideration of the following detailed description taken in conjunction with the accompanying drawing, in which:

FIG. 1 is a perspective view partially broken away to reveal internal structure; and FIG. 2 is an enlarged view illustrative of a modification of the filtering media employed in the present invention.

Referring now to the drawing, the embodiment of the invention comprises a housing or enclosure member having inlet and outlet channel means. In the specific embodiment a removable cover plate 12 is secured to flange 14 defined on member 10 by means of bolts 16 introduced through apertures 18. An inlet port 20 and outlet port 22 is defined within the cover plate. While the inlet and outlet ports have been shown at one end of the overall device it is permissible to introduce gas or liquid to be filtered at one end of the housing member with the outlet port disposed at the opposing or closed end 24. In addition, the inlet and outlet ports may be reversed in accordance with the usage required.

Centrally disposed in the housing member is the filter element 26 which will now be described. Spaced concentrically disposed wall members 28 and 30 define the lateral surfaces of the overall element with an axial passageway 32. An end plate member 34 is provided at one end enclosing both the axial passageway and the filter media containing area. A projection 36 is provided for spacing the element from the bottom end of the housing member 10. Where the inlet and/or outlet port means are provided at opposing ends, a ring type end member may be provided to enclose only the filter media area. The opposing end of the wall members remains open, however a perforated or solid end wall may be provided to prevent loss of the filtering media when the element is removed for cleaning, as will be hereinafter described.

In accordance with the teaching of the invention I provide a filter media comprising a quantity of spherical bead members 40 disposed between the wall members 28 and 30. Each of the bead members has a uniform cross section and shape. The diameter of the bead members may vary depending on the substance to be filtered. The bead members contact one another and are free from bond and contiguously disposed to define a tortuous path for filtering of the gases or liquids. Metallic materials such as stainless steel, Monel, tantalum, titanium and others may be employed, as well as non-metallic materials such as any dielectric material including glass and synthetic plastic materials. Particularly effective in the filtration of heated corrosive acids are the trifluor-ethylene plastic materials commercially available under the brand-names "Vitron" or "Teflon."

The filtering media comprising the uniform contiguous non-compacted spherical bead members define a tortuous path having a controlled porosity. Surface adhesion of any impurities within a gas or liquid on the outer walls of the spherical members, as well as the trapping of such impurities within the interstices between the spherical members provides the filtering action with the media employed. Filter element 26 is readily removed from the housing member and the filtering media may be easily cleaned by water, steam or acid to remove the trapped and adhering impurities. In addition changing of the media is simplified for the handling of any gas or liquid by substitution of the filtering material or size of the bead members to provide the degree of filtration desired.

An illustrative modification of the bead members is shown in FIG. 2. Each member 42 may be provided with a roughened exterior surface 44 to further enhance the adhesive properties of the overall filter element. Such a surface may be prepared simply by oxidizing of the metallic material. In the case of non-metallic materials such as glass or plastics an etching process may be employed to provide the roughened exterior. Further modifications are permissible, such as employment of flat parallel plate members in lieu of concentric cylinders. Since many modifications and variations from the illustrative structure may be made without departing from the spirit of the invention, the foregoing embodiment of the invention is to be considered as exemplary and not in a limiting sense.

What I claim is:

A filtering device comprising a housing member having a removable end wall enclosure member defining inlet and outlet passage means, a removable and reusable cartridge element centrally disposed within said housing member, said element comprising spaced concentrically disposed perforated wall members defining therebetween a filter media containing area and an axial passageway, a solid end wall enclosure member disposed at one end of said element, and a quantity of loose metallic spherical members of uniform dimension and shape disposed within said filter media containing area defining a tortuous path for filtration of any medium introduced into said housing member by said inlet passage, said spherical members having a roughened exterior surface of a metallic oxide.

References Cited by the Examiner

UNITED STATES PATENTS

| | | | |
|---|---|---|---|
| 807,513 | 12/05 | Stade | 210—287 X |
| 2,253,686 | 8/41 | Burckhalter | 210—443 X |
| 2,369,857 | 2/45 | Russell et al. | 210—440 X |
| 2,638,228 | 5/53 | Downey et al. | 210—282 X |
| 2,708,521 | 5/55 | Saloum | 210—282 |

FOREIGN PATENTS

| | | |
|---|---|---|
| 627,856 | 8/49 | Great Britain. |
| 831,326 | 3/60 | Great Britain. |

GEORGE D. MITCHELL, *Primary Examiner.*

HERBERT L. MARTIN, *Examiner.*